(12) United States Patent
Dong et al.

(10) Patent No.: US 11,181,442 B2
(45) Date of Patent: Nov. 23, 2021

(54) SIX-DOF MOTION TESTING AND MOTION PARAMETER DECOUPLING METHOD FOR ROTORS BASED ON SHAFT-DISK

(71) Applicant: DALIAN UNIVERSITY OF TECHNOLOGY, Liaoning (CN)

(72) Inventors: Huimin Dong, Liaoning (CN); Chu Zhang, Liaoning (CN); Delun Wang, Liaoning (CN); Jun Qiu, Liaoning (CN); Zhi Wang, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 16/969,849

(22) PCT Filed: Apr. 18, 2019

(86) PCT No.: PCT/CN2019/083171
§ 371 (c)(1),
(2) Date: Aug. 13, 2020

(87) PCT Pub. No.: WO2020/211032
PCT Pub. Date: Oct. 22, 2020

(65) Prior Publication Data
US 2021/0190634 A1   Jun. 24, 2021

(51) Int. Cl.
*G01M 13/025*   (2019.01)
(52) U.S. Cl.
CPC ................. *G01M 13/025* (2013.01)
(58) Field of Classification Search
CPC .... G01M 13/00; G01M 13/02; G01M 13/021; G01M 13/025
See application file for complete search history.

(56) References Cited

U.S. PATENT DOCUMENTS

| 5,197,846 | A | * | 3/1993 | Uno | ............................ | B25J 9/04 |
| | | | | | | 414/731 |
| 6,116,889 | A | * | 9/2000 | Pagel | ...................... | B30B 11/08 |
| | | | | | | 425/211 |

(Continued)

FOREIGN PATENT DOCUMENTS

| CN | 102107374 A | 6/2011 |
| CN | 106584464 A | 4/2017 |

(Continued)

*Primary Examiner* — Eric S. McCall
(74) *Attorney, Agent, or Firm* — Muncy, Geissler, Olds & Lowe, P.C.

(57) ABSTRACT

A six-DOF motion testing and motion parameter decoupling method for rotors based on shaft-disk is proposed, which includes a displacement sensor tooling and a precision shaft-disk fixed on the rotor where three measuring points are arranged on the surface of disk to measure the axial motion of the rotor, two measuring points on the shaft to measure the radial motion, and the angle encoder at the shaft shoulder to measure the rotation motion. The tooling guarantees the accuracy of displacement sensors. The fixed coordinate system and the shaft-disk moving coordinate system are set, and the measured values of the displacement sensors and the encoder are represented by vectors to establish the relationship between the six-DOF motion of the shaft-disk axis and the measured values of sensors. Thus, the six-DOF motion of the rotor/shaft-disk can be determined by the measured data.

2 Claims, 5 Drawing Sheets

(56) References Cited

U.S. PATENT DOCUMENTS

| | | | | |
|---|---|---|---|---|
| 6,330,837 B1* | 12/2001 | Charles | ................... | B25J 11/00 |
| | | | | 74/490.06 |
| 2014/0302462 A1* | 10/2014 | Vatcher | ................. | A63G 31/16 |
| | | | | 434/55 |
| 2020/0073432 A1* | 3/2020 | Kamon | ................. | B25J 9/0051 |

FOREIGN PATENT DOCUMENTS

| | | |
|---|---|---|
| DE | 102016121085 B3 | 8/2017 |
| FR | 3056747 A1 | 3/2018 |

\* cited by examiner

SIX-DOF MOTION TESTING AND MOTION PARAMETER DECOUPLING METHOD FOR ROTORS BASED ON SHAFT-DISK

TECHNICAL FIELD

The invention belongs to the technical field of the rotor motion accuracy test, and relates to a six-DOF motion testing and motion parameter decoupling method for rotors based on shaft-disk.

BACKGROUND

The actual motion parameters of a rotor are the key indexes to evaluate the motion and power transmission quality, which directly affect the accuracy of precision machine tools, instrument turntables, gear transmission devices and other mechanical equipment. The nominal motion of a rotor is a single-DOF rotation, and the other five DOFs are rigidly constrained. However, due to the manufacturing errors and elastic deformation of each part, the actual motion of a rotor presents six-DOF spatial behavior which is necessary to be evaluated by the six-DOF motion testing and motion parameter decoupling method. In the 1970s, the International Institution for Production Engineering Research published a unified document on the measurement of the error motion performance of the rotary axis which defines the unified terms about the axis of a rotor to promote the research of the rotor motion test method. Nowadays, the rotor motion test is widely used in the precision equipment accuracy evaluation, error compensation and fault diagnosis. With the increasing demand of the accuracy of mechanical equipment, the problem of six-DOF motion test and its precise decoupling of motion parameters is increasingly prominent, which has become the main problem of the rotor motion performance evaluation, compensation and fault diagnosis.

For the rotor motion test, one-direction measurement and two-direction measurement were applied to test the radial motion of a rotor at first. Thereafter, the method of combining the radial motion test and the axial motion test was adopted, in which the displacement sensors are installed in three directions of the coordinate system to detect the radial and axial motion of the standard bar fixed on the rotor. The rotor motion in the inclination direction can be tested by arranging displacement sensors in multiple sections. The above test method can only test some motion parameters (radial, axial or inclination) of rotors. In 1992, Lion Company of the United States used a five-point method based on the double standard ball and angle encoder to test the actual motion of a rotor, which can realize the rotor motion test with six DOFs. However, the machining of the double standard ball is very difficult and the operating condition of the rotor motion test is very harsh, especially the axial test has high requirements on rotor structure and space, which is difficult to be applied to all rotor motion tests. Another method is to measure the radial motion of two sections of the standard bar by four displacement sensors and the axial motion by one displacement sensor, which can simply measure the six-DOF motion of rotors. However, this test scheme takes up a large space and the axial displacement sensor is difficult to be arranged in the closed transmission chain. The test surface of the bar is cylindrical but not spherical, i.e. the vertical position from the measuring point of the bar to the rotor axis always changes. Although the six-DOF motion parameters can be decoupled by assuming that the vertical position is constant, the measurement principle error is introduced, which makes the decoupled motion parameters imprecise and difficult to meet the motion test requirements of precision equipment.

SUMMARY

In order to solve the problem of the universality of six-DOF motion test of rotors and that of accurate decoupling of six-DOF motion parameters existing in the prior art, the present invention proposes a six-DOF motion testing and motion parameter decoupling method of rotors based on shaft-disk. Instead of the double standard ball, a high precision shaft-disk is fixed on the rotor. The actual motion of the rotor is tested by arranging three measuring points on the surface of disk, two measuring points on the cylinder surface of shaft and installing an angle encoder on the shaft shoulder. The displacement sensors corresponding to the five measuring points are fixed on the displacement sensor tooling. The scheme of the rotor motion test is developed based on the principle of rigid body kinematics and the instantaneous six-DOF motion of the rotor is decoupled by the discrete testing data of displacement sensors and angle encoder. Therefore, the universality of the testing and precise decoupling of six-DOF motion parameters of any rotors are settled which provides the guidance for precision equipment accuracy evaluation, error compensation and fault diagnosis.

The specific technical solution of the invention is as follow: The steps of the six-DOF motion testing and motion parameter decoupling method for rotors based on shaft-disk are:

Step 1: A shaft-disk and a displacement sensor tooling are prepared, and the shaft disk is an integral body including a standard shaft, a disk and a shaft shoulder. The standard shaft is located between the disk and the shaft shoulder, whose axis is perpendicular to the disk surface and concentric with those of the disk and shaft shoulder. The displacement sensor tooling includes the sensor mounting holes and threaded holes for the installation of the displacement sensors. The tolerance of flatness, cylindricity, verticality and position of the shaft-disk and displacement sensor tooling should be one order of magnitude higher than the motion accuracy of the rotor.

Step 2: Two radial displacement sensors $A_1$ and $A_2$ are orthogonally arranged on the cylindrical surface of the shaft, and three axial displacement sensors $A_3$, $A_4$ and $A_5$ are uniformly arranged on the surface of disk, and the angle encoder is installed at shaft shoulder. The five displacement sensors are all fixed on the displacement sensor tooling which ensures the accuracy of measuring position of the displacement sensors.

Step 3: The non-measured surface of the disk is fixed on the rotor. The fixed coordinate system $S_f\{O_f; X_f, Y_f, Z_f\}$ of displacement sensor tooling and the shaft-disk moving coordinate system $S_m\{O_m; X_m, Y_m, Z_m\}$ are established, of which the $O_f$ and $O_m$ are the center of displacement sensor tooling and shaft-disk respectively, $X_f$, $Y_f$ and $Z_f$ are parallel to the direction of radial and axial displacement sensors respectively, $O_m$-$X_m$, $Y_m$ is coincident with the disk surface of the shaft-disk, and $Z_m$ is coincident with the axis of shaft. The coordinate axes of $S_f$ and $S_m$ are parallel at the initial moment.

Step 4: The six-DOF motion parameters of the rotor are described by the translational motion parameters (x,y,z) and rotational motion parameters $(\theta_x, \theta_y, \theta_z)$ in three directions of the axes of the disk-shaft coordinate system $S_m$ relative to the fixed coordinate system $S_f$. The transformation relationship between the position vector $r_{Pf}$ and $r_{Pm}$ of any point P on the rotor in the fixed coordinate system and the moving coordinate system is:

$$r_{Pf} = r_{om} + r_{Pm} = r_{om} + R_{fm} r_{Pm} \quad (1)$$

where, $r_{om}$ is the translation transformation matrix, $r_{om} = (x, y, z)^T$, $R_{fm}$ is the rotation transformation matrix, $$R_{fm} = \begin{bmatrix} c\theta_y c\theta_z & s\theta_x s\theta_y c\theta_z - c\theta_x s\theta_z & c\theta_x s\theta_y c\theta_z + s\theta_x s\theta_z \\ c\theta_y s\theta_z & s\theta_x s\theta_y s\theta_z + c\theta_x c\theta_z & c\theta_x s\theta_y s\theta_z - s\theta_x c\theta_z \\ -s\theta_y & s\theta_x c\theta_y & c\theta_x c\theta_y \end{bmatrix},$$

c and s are the abbreviations for cos and sin respectively.

Step 5: The position of the end points of the displacement sensors and the measured values are represented by vectors, and the relationship between the six-DOF parameters of the rotor and the measured values is established.

The measuring direction of radial displacement sensors $A_1$ and $A_2$ intersects the standard shaft at points $Q_1$ and $Q_2$. Make the lines vertical to the axis of shaft through $Q_1$ and $Q_2$ which intersect the axis at $P_1$ and $P_2$ respectively. The closed loop vector equations of rigid body kinematics is established for any motion position j of the rotor:

$$\begin{cases} r_{Pi}^{(j)} + d_{Ai}^{(j)} = r_{Ai} + S_{Ai}^{(j)} & i = 1, 2 \\ r_{Om}^{(j)} + d_{Ai}^{(j)} = r_{Ai} + S_{Ai}^{(j)} & i = 3, 4, 5 \\ |d_{Ai}^{(j)}| = d/2 & i = 1, 2 \end{cases} \quad (2)$$

where, $r_{Ai}$ is the position vector of the end point of each sensor which is a known quantity, $S_{Ai}^{(j)}$ is the vector from the end point of each displacement sensor to the measured point of the shaft or disk surface which is the measured value, $r_{Pi}^{(j)} = R_{fm}^{(j)}(0,0,z_{pi}^{(j)})^T + r_{Om}^{(j)}$ is the vector of $P_1$ or $P_2$ in the fixed coordinate system, $R_{fm}^{(j)}$ is the rotation transformation matrix including three rotational motion parameters, $d_{Ai}^{(j)}$ is the vector vertical to the $Z_m$ in the moving coordinate system, $r_{Om}^{(j)}$ is the translation of the moving coordinate system relative to the fixed coordinate system, including three translational motion parameters. There are 18 undetermined parameters including $r_{Om}^{(j)}$, $R_{fm}^{(j)}$, $z_{pi}^{(j)}$, $d_{Ai}^{(j)}$, and 17 scalar equations. Combined with the condition of the rotation angle measured by angle encoder, the six-DOF motion parameters of the rotor including x, y, z, $\theta_x$, $\theta_y$ and $\theta_z$ can be decoupled, and the trajectory of any point or line of the rotor can be determined to evaluate the motion performance of the rotor.

Step 5 above can be realized by another scheme: The position of the end points of the displacement sensors and the measured values are represented by vectors, and the relationship between the six-DOF motion parameters of the rotor and the measured values is established.

The measuring direction of radial displacement sensors $A_1$ and $A_2$ intersects the standard shaft at points $Q_1$ and $Q_2$. Make the lines vertical to the axis of shaft through $Q_1$ and $Q_2$ which intersect the axis at $P_1$ and $P_2$ respectively. The closed loop vector equations of rigid body kinematics is established for any motion position j of the rotor:

$$\begin{cases} r_{Pi}^{(j)} + d_{Ai}^{(j)} = r_{Ai} + S_{Ai}^{(j)} & i = 1, 2 \\ r_{Om}^{(j)} + d_{Ai}^{(j)} = r_{Ai} + S_{Ai}^{(j)} & i = 3, 4, 5 \\ (r_{P1}^{(j)} - r_{Om}^{(j)}) \times (r_{P2}^{(j)} - r_{Om}^{(j)}) = 0 \\ |d_{Ai}^{(j)}| = d/2 & i = 1, 2 \\ d_{Ai}^{(j)} \cdot (r_{P1}^{(j)} - r_{Om}^{(j)}) = 0 & i = 1, 2, \ldots, 5 \end{cases} \quad (3)$$

where, $r_{Ai}$ is the position vector of the end point of each sensor which is a known quantity, $S_{Ai}^{(j)}$ is the vector from the end point of each displacement sensor to the measured point of shaft or disk surface which is the measured value, $r_{P1}^{(j)}$, $r_{P2}^{(j)}$ and $r_{Om}^{(j)}$ are the vector of $P_1$, $P_2$ and $O_m$ from the origin $O_f$ of the fixed coordinate system, $d_{Ai}^{(j)}$ is the vector from $P_i$ or $O_m$ to $Q_i$. There are 24 undetermined parameters including $r_{P1}^{(j)}$, $r_{P2}^{(j)}$, $r_{Om}^{(j)}$, $d_{Ai}^{(j)}$, and 24 scalar equations to solve the direction vector of the axis $k_m = (r_{P1}^{(j)} - r_{Om}^{(j)})/|r_{P1}^{(j)} - r_{Om}^{(j)}|$. The direction vector of the rotor axis can be obtained without the condition of the rotation angle measured by angle encoder, including x, y, z, $\theta_x$ and $\theta_y$. Combined with the rotation angle $\theta_z$ measured by angle encoder, the trajectory of any point or line of the rotor can be determined to evaluate the motion performance of the rotor.

The beneficial effect of the invention is that the rotor motion is tested by using the shaft-disk, which is convenient for arranging the displacement sensors and reducing the space occupied by the motion test. Based on the principle of rigid body kinematics, the accurate decoupling problem of the six-DOF motion parameters of the rotor can be solved.

BRIEF DESCRIPTION OF THE DRAWINGS

In the figures, 1 is the surface of disk, 2 is the cylindrical surface of standard shaft, 3 is the shaft shoulder, 4 is the displacement sensor, 5 is the clamping screw, 6 is the displacement sensor tooling, 7 is the shaft-disk and 8 is the angle encoder.

DETAILED DESCRIPTION

In order to explain the technical solution of the invention explicitly, the invention is further described in combination with the attached figures and specific implementation cases.

The object of this embodiment is to test the six-DOF motion of a rotor and decouple the six-DOF motion parameters through the shaft-disk, displacement sensors and angle encoder.

Figure 3:
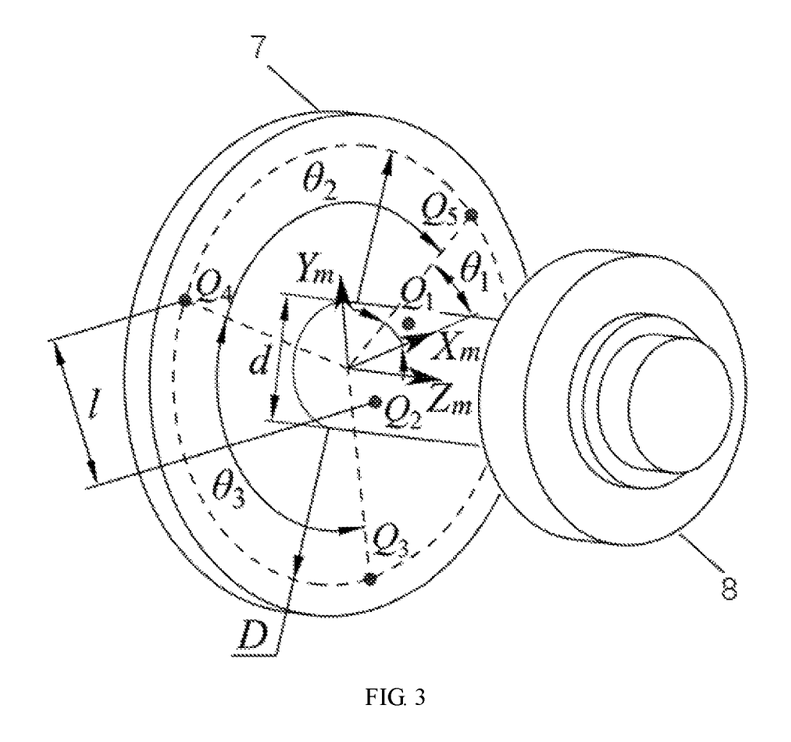
FIG. 3 is a schematic diagram of the measuring point layout of shaft-disk in a specific implementation of the invention.

The schematic diagram of relevant parameters of rotor motion test is shown in FIG. 3, and the parameter values are shown in Table 1.

TABLE 1

Parameters of the rotor motion test scheme

| d | D | l | $\theta_1$ | $\theta_2$ | $\theta_3$ |
|---|---|---|---|---|---|
| 33 mm | 114 mm | 29 mm | 30° | 120° | 120° |

Figure 1:
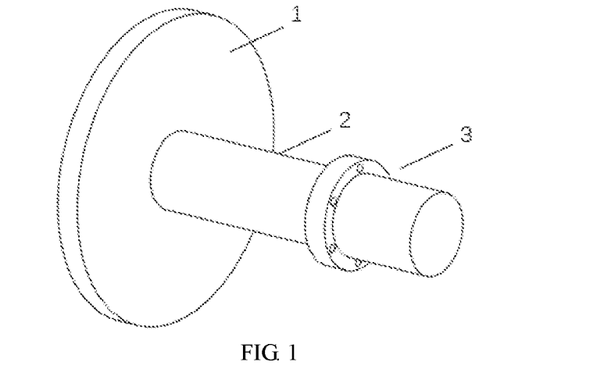
FIG. 1 is a schematic diagram of the shaft-disk in a specific implementation of the invention.
Figure 2:
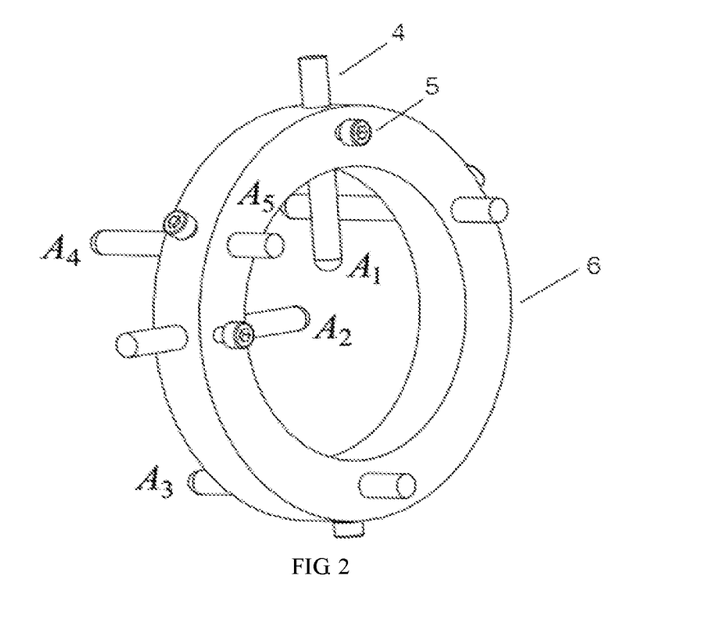
FIG. 2 is a schematic diagram of the displacement sensor tooling in a specific implementation of the invention.

Upon the six-DOF motion testing and decoupling method for rotors, the specific implementation steps are as follow:

Step 1: A shaft-disk and a displacement sensor tooling are prepared as shown in FIG. 1 and FIG. 2 meeting the parameters in Table 1. The shaft disk is an integral body including a standard shaft, a disk and a shaft shoulder. The standard shaft is located between the disk and the shaft shoulder, whose axis is perpendicular to the disk surface and concentric with those of the disk and shaft shoulder. The displacement sensor tooling includes the sensor mounting holes and threaded holes for the installation of the displacement sensors. The tolerance of flatness, cylindricity, verticality and position of the shaft-disk and displacement sensor tooling should be one order of magnitude higher than the motion accuracy of the rotor.

Step 2: Two radial displacement sensors $A_1$ and $A_2$ are orthogonally arranged on the cylindrical surface of the shaft, and three axial displacement sensors $A_3$, $A_4$ and $A_5$ are uniformly arranged on the surface of disk, and the angle encoder is installed at shaft shoulder. The five displacement sensors are all fixed on the displacement sensor tooling which ensures the accuracy of measuring position of the displacement sensors. The testing scheme is shown in FIG. 3.

Figure 4:
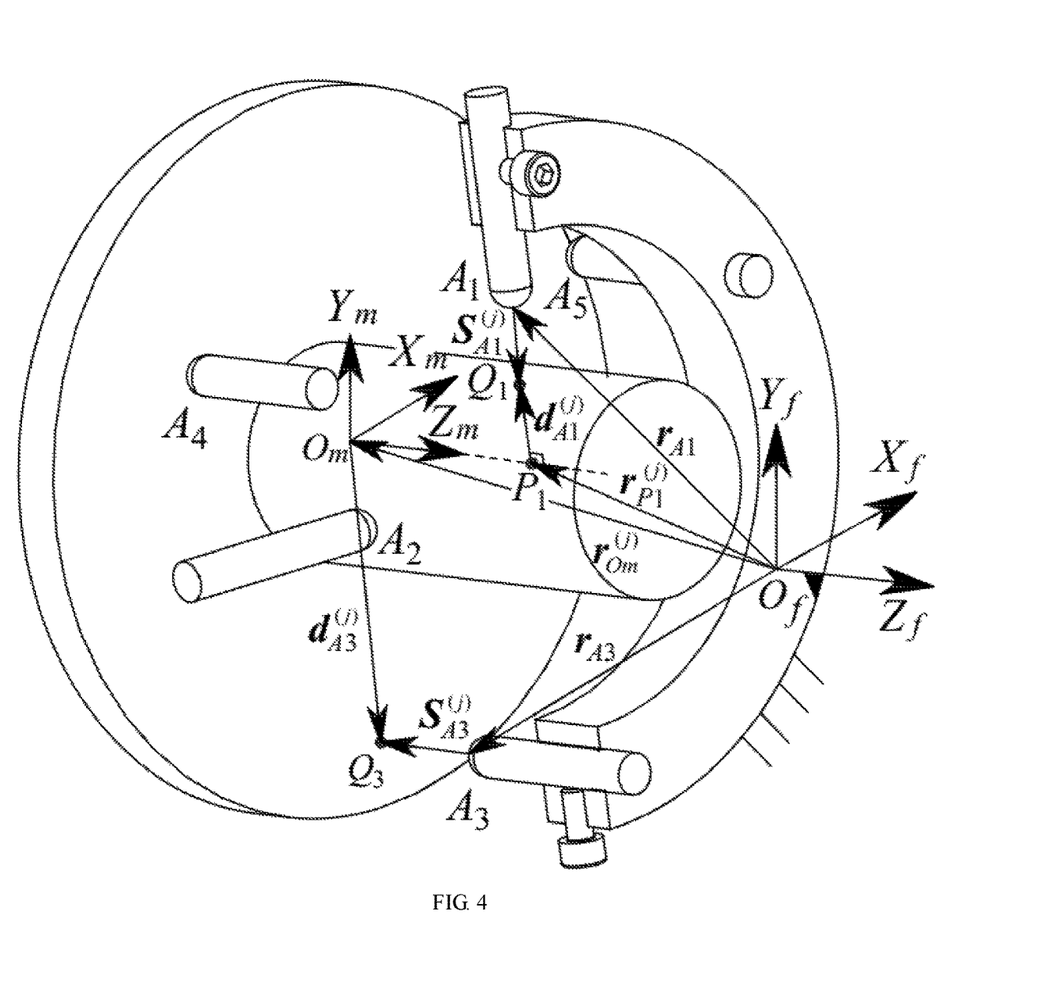
FIG. 4 is a schematic diagram of the coordinate system definition and closed-loop vector in a specific implementation of the invention.

Step 3: The non-measured surface of the disk is fixed on the rotor. The fixed coordinate system $S_f\{O_f; X_f, Y_f, Z_f\}$ of displacement sensor tooling and the shaft-disk moving coordinate system $S_m\{O_m; X_m, Y_m, Z_m\}$ are established of which the $O_f$ and $O_m$ are the center of displacement sensor tooling and shaft-disk respectively, $X_f$, $Y_f$ and $Z_f$ are parallel to the direction of radial and axial displacement sensors respectively, $O_m$-$X_m Y_m$ is coincident with the disk surface of the shaft-disk, and $Z_m$ is coincident with the axis of shaft. The coordinate axes of $S_f$ and $S_m$ are parallel at the initial moment. The definition of coordinate system is shown in FIG. 4.

Step 4: The six-DOF motion parameters of the rotor are described by the translational motion parameters (x,y,z) and rotational motion parameters $(\theta_x, \theta_y, \theta_z)$ in three directions of the axes of the disk-shaft coordinate system $S_m$ relative to the fixed coordinate system $S_f$. The transformation relationship is shown in Equation (1).

Figure 5:
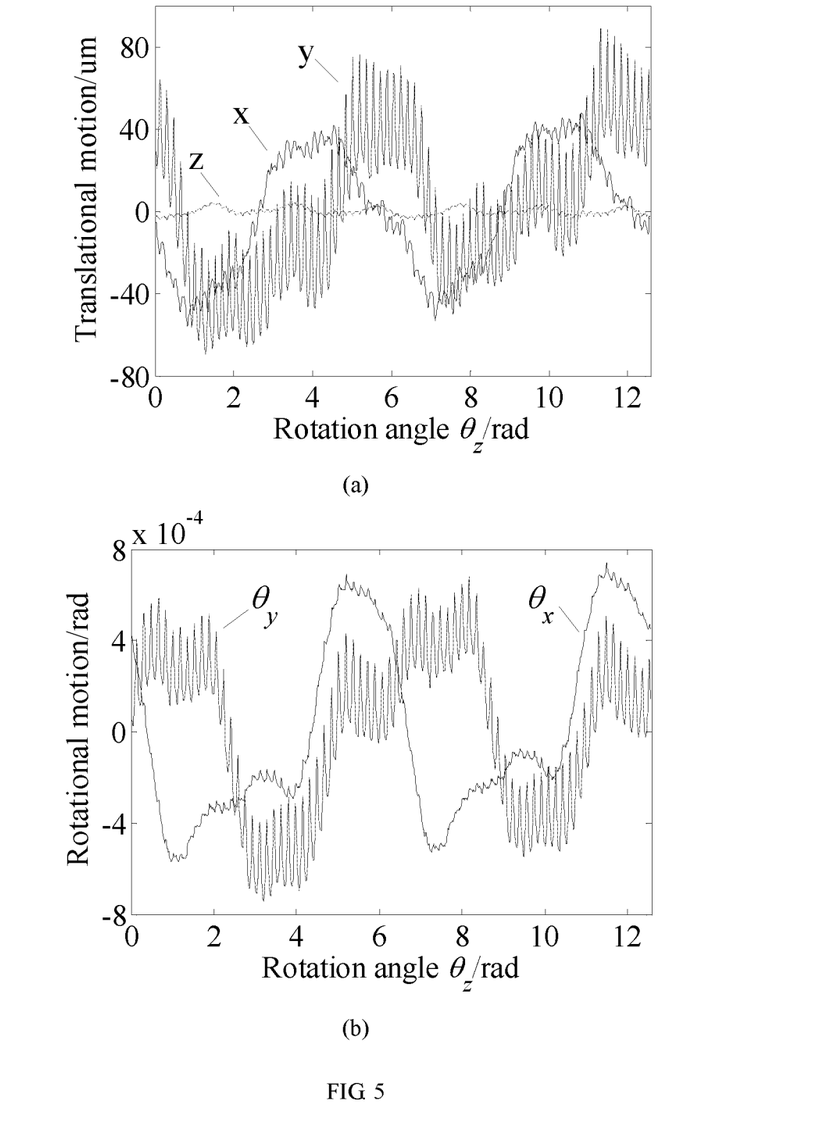
FIG. 5 is a diagram of the decoupling curves in a specific implementation of the invention.
Figure 6:
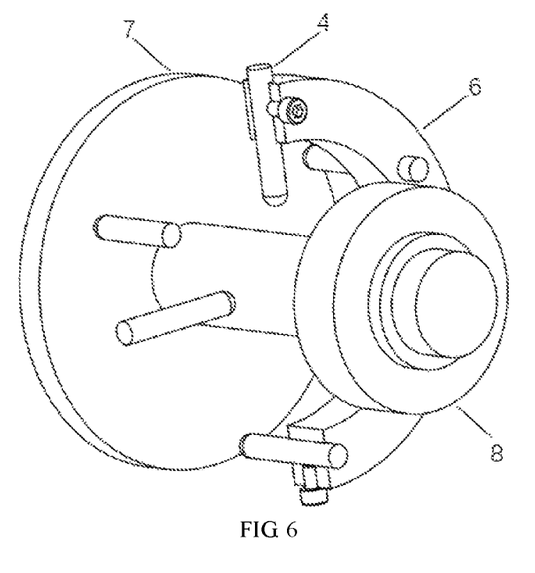
FIG. 6 is a schematic diagram of the rotor motion test structure in a specific implementation of the invention.

Step 5: The position of the end points of the displacement sensors and the measured values are represented by vectors. The end points of each displacement sensor are $r_{A1}=(0,16.5, 0)^T$, $r_{A2}=(-16.5,0,0)^T$, $r_{A3}=(0,-57,-29)^T$, $r_{A4}=(-49.36,28.5,-29)^T$ and $r_{A5}=(49.36,28.5,-29)^T$. Record the values of each displacement sensor during the process of the rotor motion, and the measured vectors are $S_{A1}^{(j)}=(0,-S_{A1}^{(j)},0)^T$, $S_{A2}^{(j)}=(S_{A2}^{(j)},0,0)^T$, $S_{A3}^{(j)}=(0,0,-S_{A3}^{(j)})^T$, $S_{A4}^{(j)}=(0,0,-S_{A4}^{(j)})^T$ and $S_{A5}^{(j)}=(0,0,-S_{A5}^{(j)})^T$, where $S_{Ai}^{(j)}$, i=1, 2, . . . , 5 are the measured values of each displacement sensor. According to the Equation (2) or (3), and the discrete measurement data of displacement sensors and angle encoder, the six-DOF motion parameters of the rotor including x, y, z, $\theta_x$, $\theta_y$ and $\theta_z$ can be decoupled as shown in FIG. 5.

The invention claimed is:

1. A six-DOF motion testing and motion parameter decoupling method for rotors based on shaft-disk, wherein comprising the following steps:

step 1: a shaft-disk and a displacement sensor tooling are prepared, and the shaft disk is an integral body including a standard shaft, a disk and a shaft shoulder; the standard shaft is located between the disk and the shaft shoulder, whose axis is perpendicular to the disk surface and concentric with those of the disk and shaft shoulder; the displacement sensor tooling includes sensor mounting holes and threaded holes for the installation of the displacement sensors; the tolerance of flatness, cylindricity, verticality and position of the shaft-disk and displacement sensor tooling should be one order of magnitude higher than the motion accuracy of the rotor;

step 2: two radial displacement sensors $A_1$ and $A_2$ are orthogonally arranged on the cylindrical surface of the shaft, and three axial displacement sensors $A_3$, $A_4$ and $A_5$ are uniformly arranged on the surface of disk, and the angle encoder is installed at shaft shoulder; the five displacement sensors are all fixed on the displacement sensor tooling which ensures the accuracy of measuring position of the displacement sensors;

step 3: the non-measured surface of the disk is fixed on the rotor; the fixed coordinate system $S_f\{O_f; X_f, Y_f, Z_f\}$ of displacement sensor tooling and the shaft-disk moving coordinate system $S_m\{O_m; X_m, Y_m, Z_m\}$ are established, of which the $O_f$ and $O_m$ are the center of displacement sensor tooling and shaft-disk respectively, $X_f$, $Y_f$ and $Z_f$ are parallel to the direction of radial and axial displacement sensors respectively, $O_m$-$X_m Y_m$ is coincident with the disk surface of the shaft-disk, and $Z_m$ is coincident with the axis of shaft; the coordinate axes of $S_f$ and $S_m$ are parallel at the initial moment;

step 4: the six-DOF motion parameters of the rotor are described by the translational motion parameters (x,y,z) and rotational motion parameters $(\theta_x, \theta_y, \theta_z)$ in three directions of the axes of the disk-shaft coordinate system $S_m$ relative to the fixed coordinate system $S_f$, the transformation relationship between the position vector $r_{pf}$ and $r_{pm}$ of any point P on the rotor in the fixed coordinate system and the moving coordinate system is:

$$r_{Pf}=r_{om}+r_{Pm}=r_{om}+R_{fm}r_{Pm} \qquad (1)$$

where, $r_{om}$ is the translation transformation matrix, $r_{om}=(x,y,z)^T$, $R_{fm}$ is the rotation transformation $$R_{fm} = \begin{bmatrix} c\theta_y c\theta_z & s\theta_x s\theta_y c\theta_z - c\theta_x s\theta_z & c\theta_x s\theta_y c\theta_z + s\theta_x s\theta_z \\ c\theta_y s\theta_z & s\theta_x s\theta_y s\theta_z + c\theta_x c\theta_z & c\theta_x s\theta_y s\theta_z - s\theta_x c\theta_z \\ -s\theta_y & s\theta_x c\theta_y & c\theta_x c\theta_y \end{bmatrix},$$

matrix, c and s are the abbreviations for cos and sin respectively;

step 5: the position of the end points of the displacement sensors and the measured values are represented by vectors, and the relationship between the six-DOF motion parameters of the rotor and the measured values is established;

the measuring direction of radial displacement sensors $A_1$ and $A_2$ intersects the standard shaft at points $Q_1$ and $Q_2$; make the lines vertical to the axis of shaft through $Q_1$ and $Q_2$ which intersect the axis at $P_1$ and $P_2$ respectively; the closed loop vector equations of rigid body kinematics is established for any motion position j of the rotor:

$$\begin{cases} r_{Pi}^{(j)} + d_{Ai}^{(j)} = r_{Ai} + S_{Ai}^{(j)} & i = 1, 2 \\ r_{Om}^{(j)} + d_{Ai}^{(j)} = r_{Ai} + S_{Ai}^{(j)} & i = 3, 4, 5 \\ |d_{Ai}^{(j)}| = d/2 & i = 1, 2 \end{cases} \quad (2)$$

where, d is the diameter of the standard shaft $r_{Ai}$ the position vector of the end point of each sensor which is a known quantity, $S_{Ai}^{(j)}$ is the vector from the end point of each displacement sensor to the measured point of the shaft or disk surface which is the measured value, $r_{Pi}^{(j)} = R_{fm}^{(j)} (0,0, z_{pi}^{(j)})^T + r_{Om}^{(j)}$ is the vector of $P_1$ or $P_2$ in the fixed coordinate system, $R_{fm}^{(j)}$ is the rotation transformation matrix including three rotational motion parameters, $d_{Ai}^{(j)}$ is the vector vertical to the $Z_m$ in the moving coordinate system, $r_{Om}^{(j)}$ is the translation of the moving coordinate system relative to the fixed coordinate system, including three translational motion parameters; there are 18 undetermined parameters including $r_{Om}^{(j)}$, $R_{fm}^{(j)}$, $z_{pi}^{(j)}$, $d_{Ai}^{(j)}$, and 17 scalar equations; combined with the condition of the rotation angle measured by angle encoder, the six-DOF motion parameters of the rotor including x, y, z, $\theta_x$, $\theta_y$ and $\theta_z$ can be decoupled, and the trajectory of any point or line of the rotor can be determined to evaluate the motion performance of the rotor.

2. The six-DOF motion testing and motion parameter decoupling method for rotor based on shaft-disk according to claim 1, wherein, step 5: the position of the end points of the displacement sensors and the measured values are represented by vectors, and the relationship between the six-DOF motion parameters of the rotor and the measured values is established;

the measuring direction of radial displacement sensors $A_1$ and $A_2$ intersects the standard shaft at points $Q_i$ and $Q_2$; make the lines vertical to the axis of shaft through $Q_1$ and $Q_2$ which intersect the axis at $P_1$ and $P_2$ respectively; the closed loop vector equations of rigid body kinematics is established for any motion position j of the rotor:

$$\begin{cases} r_{Pi}^{(j)} + d_{Ai}^{(j)} = r_{Ai} + S_{Ai}^{(j)} & i = 1, 2 \\ r_{Om}^{(j)} + d_{Ai}^{(j)} = r_{Ai} + S_{Ai}^{(j)} & i = 3, 4, 5 \\ (r_{P1}^{(j)} - r_{Om}^{(j)}) \times (r_{P2}^{(j)} - r_{Om}^{(j)}) = 0 \\ |d_{Ai}^{(j)}| = d/2 & i = 1, 2 \\ d_{Ai}^{(j)} \cdot (r_{P1}^{(j)} - r_{Om}^{(j)}) = 0 & i = 1, 2, \ldots, 5 \end{cases} \quad (3)$$

where, d is the diameter of the standard shaft, $r_{Ai}$, is the position vector of the end point of each sensor which is a known quantity, $S_{Ai}^{(j)}$ is the vector from the end point of each displacement sensor to the measured point of shaft or disk surface which is the measured value, $r_{P1}^{(j)}$, $r_{P2}^{(j)}$ and $r_{Om}^{(j)}$ are the vector of $P_1$, $P_2$ and $O_m$ from the origin $O_f$ of the fixed coordinate system, $d_{Ai}^{(j)}$ is the vector from $P_i$ or $O_m$ to $Q_i$; there are 24 undetermined parameters including $r_{P1}^{(j)}$, $r_{P2}^{(j)}$, $r_{Om}^{(j)}$, $d_{Ai}^{(j)}$, and 24 scalar equations to solve the direction vector of the axis $k_m = (r_{P1}^{(j)} - r_{Om}^{(j)})/|r_{P1}^{(j)} - r_{Om}^{(j)}|$; the direction vector of the rotor axis can be obtained without the condition of the rotation angle measured by angle encoder, including x, y, z, $\theta_x$ and $\theta_y$, combined with the rotation angle $\theta_z$ measured by angle encoder, the trajectory of any point or line of the rotor can be determined to evaluate the motion performance of the rotor.

\* \* \* \* \*